United States Patent [19]

Ingalls et al.

[11] Patent Number: 5,022,950

[45] Date of Patent: Jun. 11, 1991

[54] ON-LINE EMBOSSING APPARATUS FOR A LABELING MACHINE

[75] Inventors: John L. Ingalls, Richmond; Reiner G. Brinker, Mechanicsville; Jesse L. Hawkins, Jr., Richmond, all of Va.

[73] Assignee: Philip Morris Incorporated, New York, N.Y.

[21] Appl. No.: 381,116

[22] Filed: Jul. 17, 1989

[51] Int. Cl.[5] .............................................. B32B 31/00

[52] U.S. Cl. ........................................ 156/361; 53/51; 156/553; 425/145

[58] Field of Search ............................... 156/350–352, 156/361, 209, 553, 220, 353; 53/51; 425/145

[56] References Cited

U.S. PATENT DOCUMENTS

| | | | |
|---|---|---|---|
| 1,850,801 | 3/1932 | Langston et al. . | |
| 1,926,485 | 9/1933 | Jackson . | |
| 1,983,323 | 12/1934 | Stokes . | |
| 2,977,730 | 4/1961 | Ardner . | |
| 3,075,328 | 1/1963 | Willbrandt . | |
| 3,212,229 | 10/1965 | Vreeland et al. . | |
| 3,350,988 | 11/1967 | Schultz . | |
| 3,465,384 | 9/1969 | Barchi et al. | 425/214 X |
| 3,505,776 | 4/1970 | Cloud . | |
| 3,788,028 | 1/1974 | Folkesson et al. . | |
| 4,527,788 | 7/1985 | Masuda . | |
| 4,552,608 | 11/1985 | Hoffmann et al. . | |
| 4,573,954 | 3/1986 | Berger et al. . | |
| 4,610,649 | 9/1986 | Friess . | |
| 4,738,073 | 4/1988 | Mattei et al. | 53/51 |
| 4,773,959 | 9/1988 | Smith | 156/361 X |

*Primary Examiner*—David A. Simmons
*Attorney, Agent, or Firm*—Eric M. Lee

[57] ABSTRACT

An apparatus for embossing and cutting printed labels from a sheet of printed labels is disclosed. The apparatus accurately embosses each printed label on the sheet at a particular location within specified tolerances. The apparatus thereafter accurately cuts each embossed printed label from the sheet of labels.

27 Claims, 3 Drawing Sheets

ON-LINE EMBOSSING APPARATUS FOR A LABELING MACHINE

BACKGROUND OF THE INVENTION

The present invention relates to an apparatus that can be added to a conventional labeling machine to emboss printed labels as the labels are fed in a continuous web to the cutting device of the labeling machine.

The appearance of a packaged good can be enhanced by embossing a design on the printed label of the package. Such an embossed design may, for example, be chosen to correspond with a printed design on the label to emphasize and improve the attractiveness of the printed design.

In a typical printing, labeling and packaging system, such as a system of the type used to package cigarettes in soft cigarette packs, labels are printed on a continuous web of label material. After printing, the web of label material is wound onto a bobbin for transfer to a labeling machine which cuts the web into individual labels and applies the labels to packages that pass through the machine. If an embossed design is desired and the labels are embossed contemporaneously with the printing operation, the embossed design may be flattened and thus damaged by the subsequent winding of the web onto the bobbin for the labeling machine.

In other systems, the labels are cut immediately after being printed and are fed through the labeling machine individually. An embossed design can in this case be applied during the printing process without being subject to the damage caused by subsequent winding of the web onto a bobbin for the labeling machine. This system however, is not as fast and efficient as using bobbin-fed labeling machines.

With both of these systems, where the embossed design is intended to correspond to a printed design on each label, such as in the case of a raised emblem, the embossing head must be accurately synchronized with the moving web. Even a slight mismatch between the embossed design and the printed design will result in an unattractive appearance.

In view of the foregoing, it would be desirable to provide an embossing apparatus that operates in conjunction with a bobbin-fed labeling machine to emboss a web of labels as the web is fed through the labeling machine but that will not damage the embossed design by subsequent handling of the web.

It would also be desirable to provide an embossing apparatus that can operate at high speed.

It would still further be desirable to provide an embossing apparatus that embosses each printed label on a moving web of labels at a particular point on the label within narrow tolerances.

SUMMARY OF THE INVENTION

It is therefore an object of this invention to provide an embossing apparatus that operates in conjunction with a bobbin-fed labeling machine to emboss a web of labels as the web is fed through the labeling machine but that does not damage the embossed design by subsequent handling of the web.

It is another object of this invention to provide an embossing apparatus that can operate at high speed.

It is still another object of this invention to provide an embossing apparatus that embosses each printed label on a moving web of labels at a particular point on the label within narrow tolerances.

In accordance with this invention, there is provided an apparatus for embossing designs on a continuous web of labels as the web advances through a conventional bobbin-fed labeling machine. In one embodiment, a photocell is used to sense a registration mark associated with each label on the web. The photocell provides a signal, based on the registration mark, to a controller. The controller compares this signal with a signal based on the speed and phase of a cutting device which cuts each label from the moving web. By comparing these signals, the controller determines whether the web will be properly aligned as it moves past the cutting device. A signal based on this comparison is sent from the controller to a stepper or servo motor which controls an associated pulling roller. This pulling roller in turn controls the advancement of the web past the cutting device. In this manner, the web is controlled to ensure that it is properly aligned as it passes through the cutting device. To properly emboss each label, an embossing head is positioned upstream of the pulling roller. By synchronizing the phase and speed of the embossing head with the phase and speed of the cutting device, adjustments to the pulling roller will ensure that each label will be properly aligned for embossing and cutting.

In a second and preferred embodiment, the speed and phase of the embossing head are adjusted independently of the speed and phase of the cutting device. A first photocell is located upstream of the embossing head and a second photocell is located between the embossing head and the cutting device. The first photocell senses a registration mark associated with each label on the web and sends a signal to a controller. A signal is also sent to the controller from an encoder which indicates the speed of the web. Yet another signal is sent to the controller from a resolver associated with the motor driving the embossing head. The resolver detects the angular position of the motor. Based on a comparison of these signals, the controller sends a signal to a stepper or servo motor associated with the embossing head to adjust the embossing head so the label is embossed at the proper location. After the web passes through the embossing head, a second photocell senses the same registration mark. The second photocell thus determines the location of each label. As described in connection with the first embodiment, a pulling roller is then adjusted based on a comparison of the location of the web with the speed and phase of a cutting device. This ensures that the web is properly aligned as it passes through the cutting device. In addition, a third photocell, a line scan camera, and a lateral guide may be positioned upstream of the embossing head and the first photocell to control the lateral movement of the web.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Although the invention is described in connection with the Model X-1 manufactured by G. D. Societa per Azioni of Bologna, Italy, it is to be understood that the invention may be used in connection with any one of a large number of other commercially available packaging or labeling machines. It is also to be understood that the present invention is not limited to the field of cigarette packaging, and can be used to emboss a web of labels or other packaging materials for any product.

Conventional bobbin-fed labeling machines, such as the Model X-1, typically employ a registration system to synchronize the cutting device of the machine with the advancing web of printed labels. The registration system uses sensors such as photocells to determine the location of registration or eye marks associated with each label on the web. These registration marks typically are applied during the printing process. As each registration mark associated with each label passes a photocell, the photocell produces an electrical signal indicative of the location of the label. This signal is compared to a second electrical signal indicative of the speed and phase of the cutting device. Based on a comparison of these signals, the voltage supplied to a stepper or servo motor controlling a pulling roller is varied to cause the stepper or servo motor to increase or decrease the speed at which the pulling roller advances the web. This ensures that the web advances past the cutting device at the proper time so the web is cut at the boundary between each label.

Figure 1:
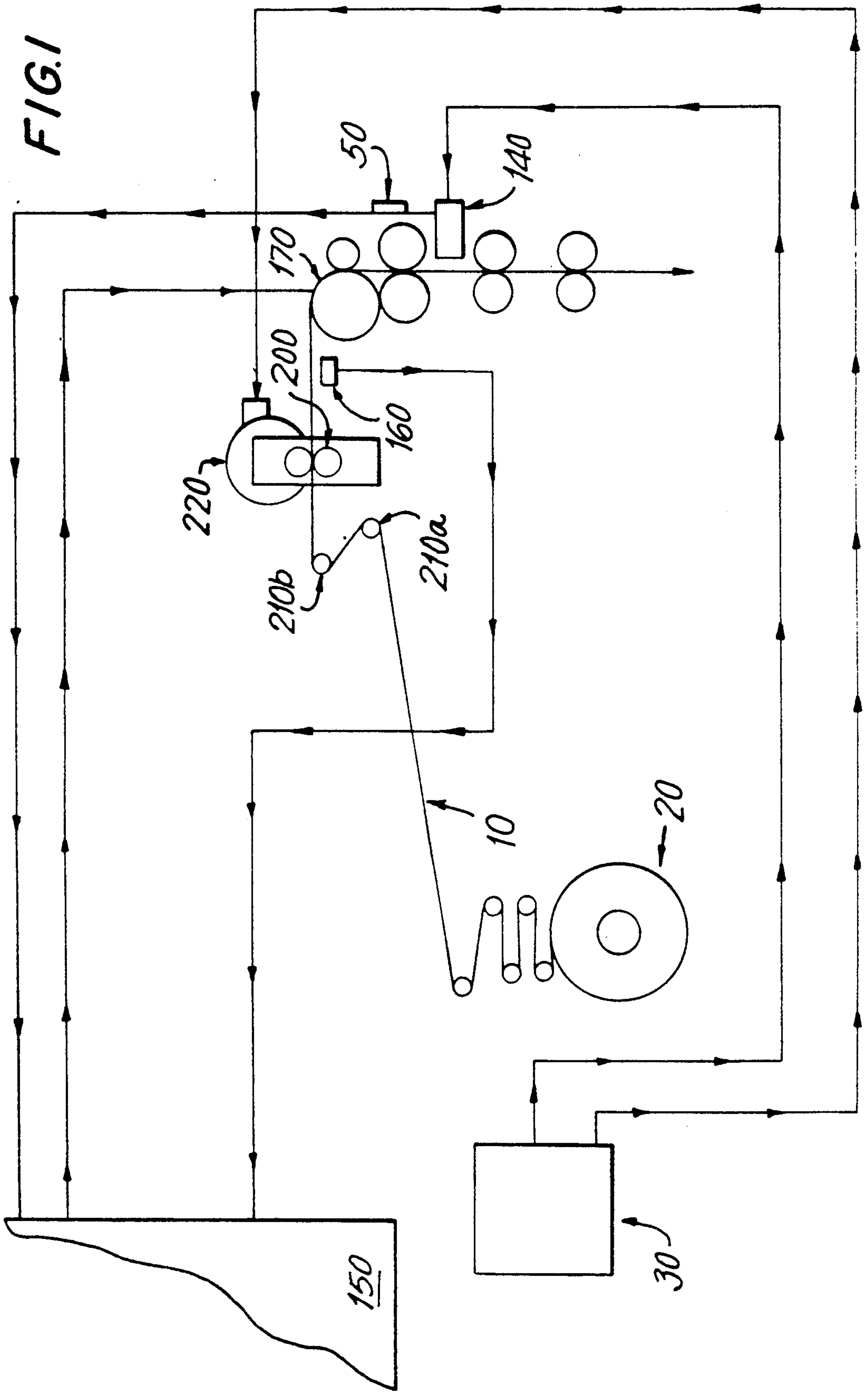
FIG. 1 is a schematic diagram of one embodiment of the present invention.

In a bobbin-fed labeling machine such as the Model X-1, any damage to embossed designs on the printed labels making up the web can be avoided by embossing the labels as the web moves through the machine prior to the cutting operation. In one embodiment of this invention as shown in FIG. 1, an embossing head 200 is positioned upstream of an optical sensor 160 and the cutting device 140. The term upstream is used to mean the direction opposite to the movement of web 10 which is generally left to right.

Cutting device 140 is supplied with the Model X-1 to cut web 10 at the boundary between each printed label which makes up web 10. Web 10 is drawn from bobbin 20. Cutting device 140 comprises a single knife edge located along the length of a roller and generally parallel to the boundary between the printed labels. As the roller rotates, the knife edge periodically comes in contact with and thereby cuts web 10. An encoder 50, which is supplied with the Model X-1 and is associated with cutting device 140, senses the position and rotation rate of cutting device 140. Encoder 50 generates a digital signal representative of this information. This signal is then provided to controller 150, which is also supplied with the Model X-1.

An optical sensor 160 such as a photocell having model number NT8 manufactured by SICK and which is supplied with the Model X-1 senses a registration mark associated with each label as web 10 moves past it. This photocell could be replaced with photocell SWITCH SM 312 CVG manufactured by Banner or some other standard photocell. Optical sensor 160 provides a digital signal to controller 150 based on the location of the registration mark.

Embossing head 200 is located upstream of optical sensor 160 and cutting device 140. A series of guide rollers 210*a* and 210*b* guide web 10 first through embossing head 200, through pulling roller 170 and then through cutting device 140. Embossing head 200 is comprised of two rotating rollers between which web 10 moves. Preferably two raised emblems each having the same design to be embossed on the labels are located on one roller. Preferably the two raised designs are located 180° from each other. The other roller has cavities in which the raised designs of the first roller can nest as the two rollers rotate. As web 10 advances between rotating rollers, the raised design engages with web 10 and momentarily nests inside the cavity of the other roller to emboss web 10.

The rollers are rotated by an associated stepper or servo motor 220. Both stepper motor 220 and cutting device 140 operate at the speed of the machine via motor driver 30. Motor driver 30 thus drives embossing head 200 and cutting device 140 at the same phase and speed.

Pulling roller 170 frictionally engages web 10 and can thereby increase or decrease the rate at which web 10 advances. A stepper motor (not shown) is associated with pulling roller 170. The stepper motor rotates through a given angular increment in response to a digital pulse input signal generated by controller 150. This signal is generated by controller 150 and is based on a comparison of the signal generated by encoder 50 and the signal generated by optical sensor 160. Controller 150 thus varies the pulse rate of the digital signal provided to the stepper motor depending on the difference in the signals generated by optical sensor 160 and encoder 50. As a result, pulling roller 170 increases or decreases the rate at which web 10 advances. This ensures that web 10 is embossed at the proper point and cut at the boundary between each label.

For example, if web 10 begins to slip as it advances toward cutting device 140, controller 150 detects this deviation because of the change in the signal generated by optical sensor 160. As a result, controller 150 increases the rate of the pulses provided to the stepper motor to cause pulling roller 170 to advance web 10 sufficiently to overcome the deviation. On the other hand, if for some reason the web is moving too rapidly, this deviation is also detected and controller 150 decreases the rate of the pulses provided to the stepper motor associated with pulling roller 170. This causes pulling roller 170 to prevent web 10 from moving as rapidly.

Figure 2:
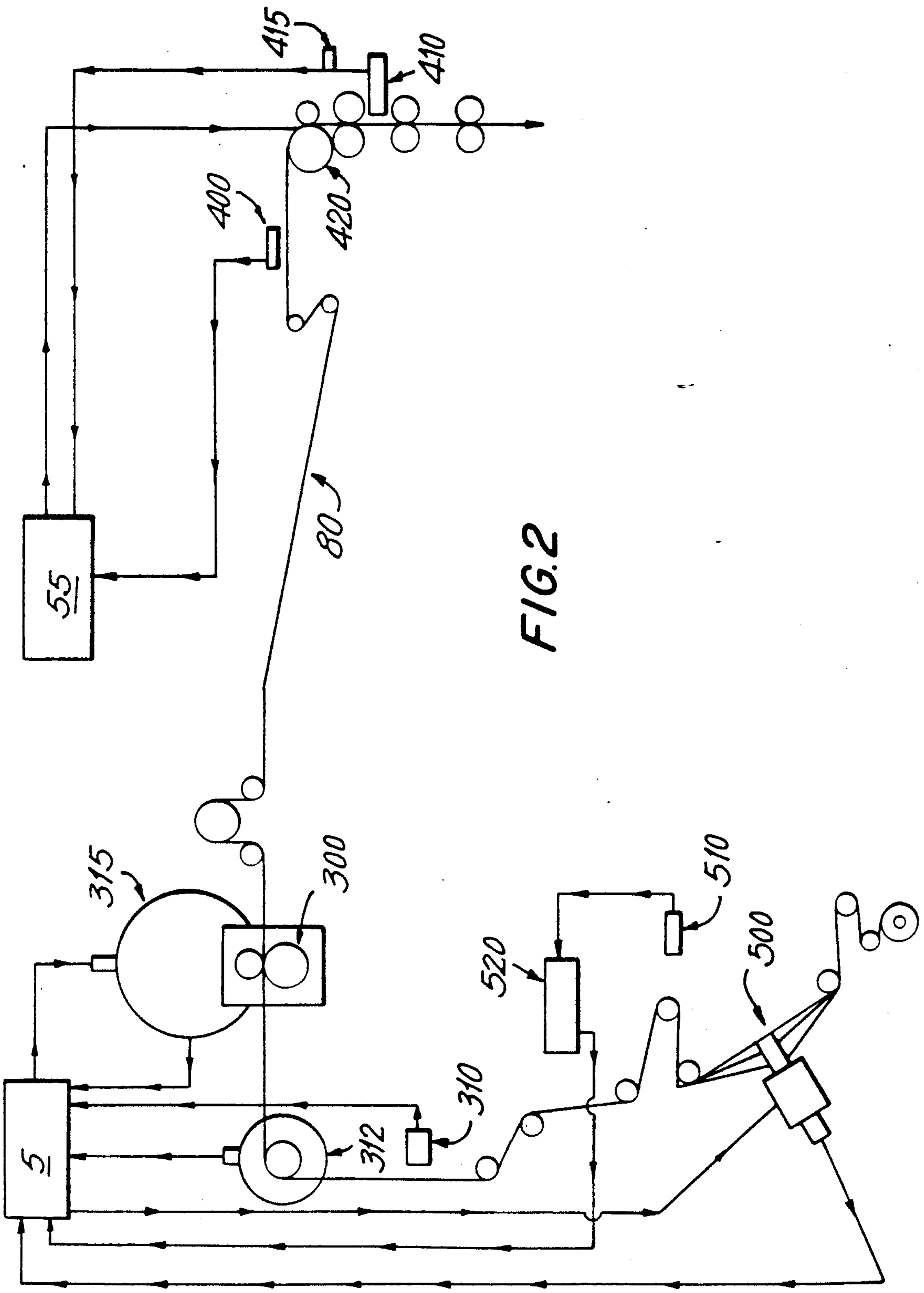
FIG. 2 is a schematic diagram of a preferred embodiment of the present invention.

FIG. 2 shows another and preferred embodiment of this invention. In this embodiment, an embossing head 300 is positioned upstream of the optical sensor 400 and associated cutting device 410. Optical sensor 400 and cutting device 410 are standard equipment on the Model X-1.

A second optical sensor 310 is positioned upstream of embossing head 300 and encoder 312. Optical sensor 310, which is preferably a photocell such as the SM 312 CVG manufactured by Banner, reads a registration mark on each label of web 80 and generates a digital signal based on the location of that registration mark. This signal is then sent to controller 5. In addition, controller 5 receives signals from a resolver associated with embossing head 300. This resolver tells controller 5 the angular position of motor 315. Controller 5 also receives signals from encoder 312 which tracks the speed and position of web 80.

Controller 5 compares these three signals to determine whether embossing head 300 is synchronized with the speed and position of web 80. Theoretically, the signal received by controller 5 from the resolver associated with embossing head 300 and from encoder 312 should be the same. This condition indicates that embossing head 300 is properly synchronized with the speed and position of web 80. If embossing head 300 is not properly synchronized, photocell 310 provides an offset input signal to controller 5. This signal provides a measurement of the time interval between registration marks on web 80. Controller 5 subtracts this measured interval from the theoretical value for this interval for there to be synchronization. Controller 5 then uses this difference to determine how much stepper or servo motor 315 should speed up or slow down for embossing head 300 to be properly synchronized. Preferably controller 5 is a SAM-PLUS/CONTROL system manufactured by Creonics Inc. of Lebanon, N.H.

It is important that embossing be performed at a particular location within narrow tolerances. One means of accomplishing this is for controller 5 to be a closed servo loop system that uses feedforward. This eliminates the time lag associated with typical servo loop systems and provides a more accurate control means. An additional means of accomplishing this is by using a small size beam for optical sensor 310. Preferably a photocell with a beam diameter of about 0.25 inches, such as used in part number SM 312 CVG manufactured by Banner, is used. By using a small beam size, optical sensor 310 can sense slight deviations in the location of web 80 thereby more accurately controlling embossing head 300.

After web 80 has been embossed, it travels past optical sensor 400. Preferably optical sensor 400 senses the same registration mark as that sensed by optical sensor 310 and provides a signal based on the location of this registration mark to a second controller 55. Of course a second registration mark could be sensed by optical sensor 400 instead of the same registration mark sensed by optical sensor 310. Controller 55 also receives a signal generated by an encoder 415 associated with cutting device 410. This signal is based on the phase and speed of cutting device 410. Controller 55 is programmed to compare these signals and, based on this comparison, provide a signal to pulling roller 420. As discussed in connection with the first embodiment, if web 80 is not in alignment, a signal is sent by controller 55 to a stepper motor associated with pulling roller 420. Pulling roller 420 in turn increases or decreases the speed of web 80 a predetermined increment in response to the signal sent by controller 55. This ensures that web 80 is cut at the proper location.

A lateral guide 500 for controlling the lateral position of web 80 is located upstream of optical sensor 310. A third optical sensor 510 such as the SM 312 CVG photocell manufactured by Banner preferably reads the same registration mark that is used for the embossing operation. Preferably, this registration mark is formed in the shape of a T with optical sensor 510 reading that part of the registration mark perpendicular to the part of the registration mark read in conjunction with the embossing operation.

Preferably a line scan camera 520 such as HVS 256 manufactured by Honeywell is used in connection with the lateral guide to attain greater lateral accuracy in positioning web 80. Line scan camera 520 is located downstream of photocell 510. Photocell 510 senses the registration mark and tells line scan camera 520 when it should see that part of the registration mark sensed by photocell 510. Line scan camera 520 senses this part of the registration mark and sends a signal to controller 5 indicating the location of the registration mark. Line scan camera 520 sends an analog voltage, preferably between 1 and 10 volts to controller 5. If the part of the registration mark sensed by line scan camera 520 is in the center of the line scanned by line scan camera 520, preferably line scan camera 520 sends an analog voltage of 5 volts to controller 5. If the registration mark is not centered, some other voltage between 0 and 10 will be sent to controller 5. With the ability to detect small deviations in the position of the registration mark, line scan camera 520 can be used to accurately position web 80 for accurate embossing.

A signal is also sent to controller 5 from a resolver associated with the motor controlling lateral guide 500 to indicate the position of lateral guide 500. Based on a comparison of this signal and the voltage received from line scan camera 520, controller 5 sends a signal to the stepper or servo motor associated with lateral guide 500 to adjust the lateral position of web 80. Preferably, lateral guide 500 can move no more than about $\frac{1}{4}$ of an inch on either side of center.

Alternatively, the signal generated by optical sensor 510 could be fed directly to controller 5 or to a separate controller. A signal would still be sent to controller 5 from a resolver associated with the stepper or servo motor controlling lateral guide 500. Controller 5 would then compare these signals and then send a signal to the stepper or servo motor associated with lateral guide 500 to adjust the lateral position of web 80. However, without line scan camera 520, accuracy of position would be compromised.

Figure 3:
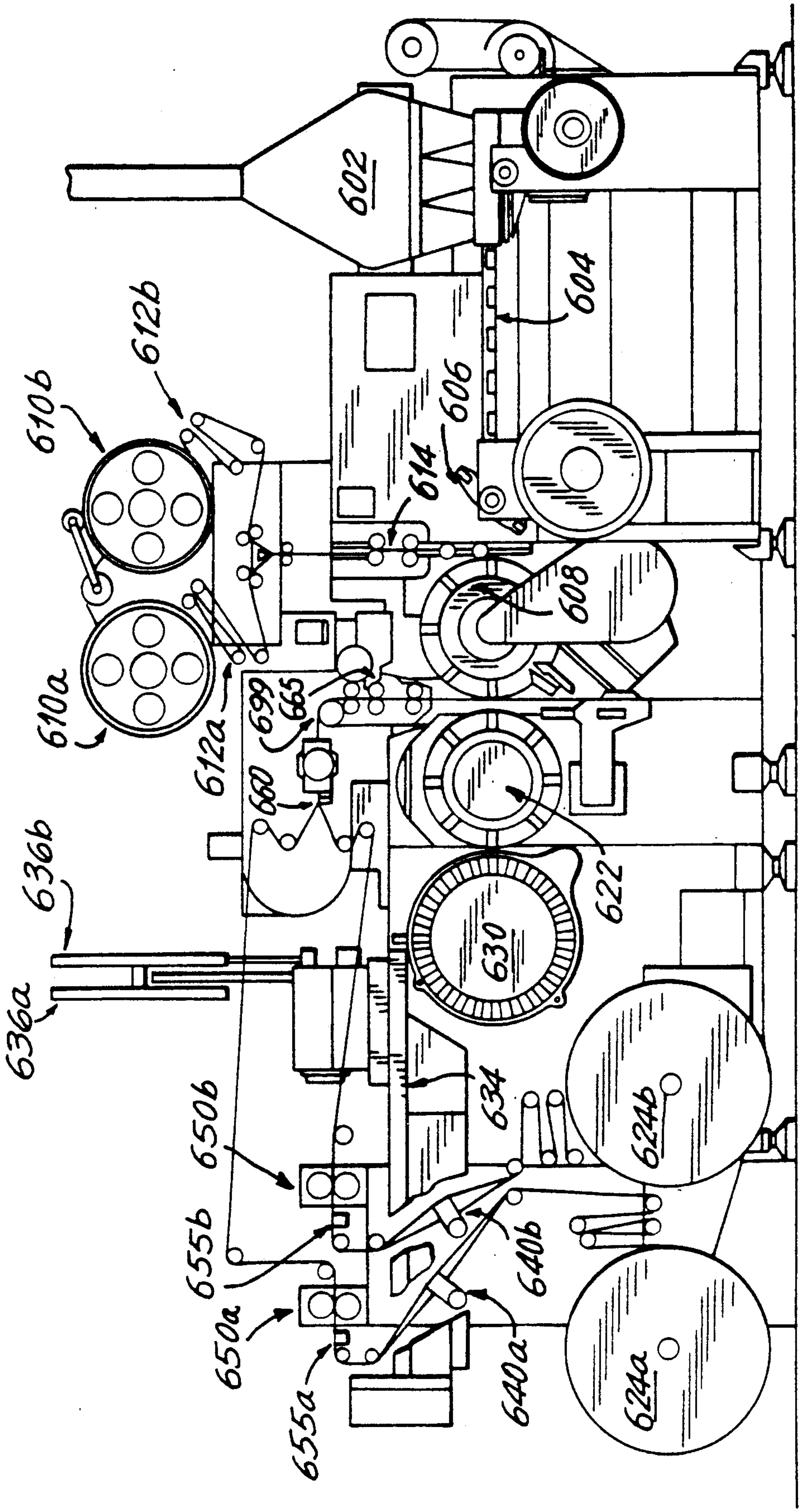
FIG. 3 is a front elevation view of a conventional bobbin-fed soft cigarette pack labeling and packaging machine modified to incorporate the preferred embodiment of the present invention.

FIG. 3 shows a Model X-1 of G. D. Societa per Azioni of Bologna, Italy, that has been modified to include the preferred embodiment of this invention. The Model X-1 is designed to package and label soft cigarette packs.

Cigarettes are fed into the machine by hopper 602 and are transported in discrete bundles (each bundle comprising the cigarettes to be packaged in a single soft cigarette pack) by conveyor 604 to armature 606. Armature 606 causes the cigarettes to be transferred to drum 608 one bundle at a time. As each cigarette bundle is transferred, a length of packaging material (e.g., foil wrapper) is wrapped around the bundle. This packaging material is supplied by one of two bobbins 610*a* and 610*b* which are alternated as necessary for reloading or repair. This packaging material is guided by a series of guide rollers 612*a* and 612*b* to a cutting device 614 positioned above the transfer point between armature 606 and drum 608. Cutting device 614 cuts the packaging material into separate lengths for wrapping around the cigarette bundles. The packaging around each bundle is closed as the bundle travels clockwise around drum 608. The soft packs are then transferred to drum 622. As each soft pack is transferred, an embossed label that has been cut from a web of printed labels is applied to the soft pack.

The label material is supplied by one of two bobbins 624*a* and 624*b* which, like bobbins 610*a* and 610*b*, are alternated as necessary for reloading or repair. Lateral guides 640*a* and 640*b* are provided, one for each web supplied by bobbins 624*a* and 624*b*. An optical sensor and line scan camera combination (not shown) are positioned downstream of each of the lateral guides 640*a* and 640*b* to sense the location of the web. The signal generated by the line scan camera is used as a basis to adjust the lateral guides to control the lateral position of the web. Identical embossing heads 650*a* and 650*b* are provided, one for each web supplied by bobbins 624*a* and 624*b*. Optical sensors 655*a* and 655*b* are positioned one in front of each embossing head. Each embossing head is synchronized to emboss each label on the web at the proper location. Another optical sensor 660 is positioned in front of cutting device 665. Pulling roller 699 is synchronized by means of optical sensor 660 and a controller (not shown) to cut each label on the web at the proper location by cutting device 665.

The embossed and cut label is sealed on each soft pack as the soft packs are transported around drum 622. The softpacks are then transferred to drum 630. Drum 630 rotates counter clockwise to deliver the soft packs to track 634. Before entering track 634, a length of enclosure stamp is applied across the top of each soft pack. The enclosure stamp foil tape is supplied by one of two alternate bobbins 636*a* and 636*b*. The soft packs are then transported along track 634 to additional machinery (not shown) for finishing the packaging of the soft cigarette packs (e.g., application of a cellophane wrapper).

Thus it can be seen that an embossing apparatus is provided that operates in conjunction with a bobbin-fed labeling machine to emboss a web of labels within specified narrow tolerances as the web is fed through the machine without damaging the embossed design. One skilled in the art will appreciate that the present invention can be practiced by other than the described embodiments, which are presented for purposes of illustration and not of limitation, and the present invention is limited only by the claims which follow.

What is claimed is:

1. An apparatus for embossing and cutting printed labels, comprising:

a feed means for feeding a sheet of printed labels through said apparatus;

an embossing means located upstream of said feed means for embossing each printed label of said sheet of printed labels;

a sensing means located between said embossing means and said feed means for sensing the location of a registration mark on each printed label of said sheet of printed labels;

a cutting means located downstream of said feed means for cutting each printed label from said sheet of printed labels; and a control means for controlling the feed rate of said sheet of printed labels to said embossing means and to said cutting means, wherein said control means receives data from said sensing means based on the location of said registration mark and data from said cutting means based on the speed and phase of said cutting means to thereby control said feed means and ensure that each printed label is embossed within specified tolerances at a specific location and each printed label is cut from said sheet within specified tolerances at a specific location.

2. The apparatus of claim 1 wherein said embossing means and said cutting means operate at the same speed and phase.

3. The apparatus of claim 2 wherein said sensing means is a photocell having a beam size of about 0.25 inches.

4. An apparatus comprising:

a first sensing means for sensing the location of a registration mark on each printed label of a sheet of printed labels;

an encoding means located downstream of said first sensing means for sensing the speed and location of said sheet of printed labels;

an embossing means located downstream of said encoding means for embossing each printed label of said sheet of printed labels;

a resolving means associated with said embossing means for sensing the phase and speed of said embossing means; and a first control means for controlling said embossing means, wherein said first control means receives data from said first sensing means based on the location of said registration mark, data from said encoding means based on the speed and phase of said sheet of printed labels and data from said resolving means based on the speed and phase of said embossing means to thereby control said embossing means and ensure that each printed label is embossed at a specific location within specified tolerances.

5. The apparatus of claim 4 further comprising:

a second sensing means located downstream of said embossing means for sensing the location of said registration mark on each printed label of said sheet of printed labels;

a cutting means located downstream of said second sensing means for cutting each printed label from said sheet of printed labels;

a feed means located between said second sensing means and said cutting means for feeding said sheet of printed labels past said cutting means; and a second control means for controlling said feed means, wherein said second control means receives data from said second sensing means based on the location of said registration mark and data from said cutting means based on the speed and phase of said cutting means to ensure that each printed label is cut from said sheet of printed labels at a specific location within specified tolerances.

6. The apparatus of claim 4 further comprising:

a second sensing means located downstream of said embossing means for sensing the location of said registration mark on each printed label of said sheet of printed labels;

a cutting means located downstream of said second sensing means for cutting each printed label from said sheet of printed labels;

a feed means located between said second sensing means and said cutting means for feeding said sheet of printed labels past said cutting means; and wherein said first control means receives data from said second sensing means based on the location of said registration mark and data from said cutting means based on the speed and phase of said cutting means to thereby control said feed means and ensure that each printed label is cut from said sheet of printed labels at a specific location within specified tolerances.

7. The apparatus of claim 4 wherein said first sensing means is a photocell having a beam size of about 0.25 inches.

8. The apparatus of either of claims 5 or 6 further comprising:

a third sensing means located upstream of said first sensing means for sensing the location of said registration mark on each printed label of said sheet of printed labels;

a lateral positioning means located upstream of said third sensing means for adjusting the lateral position of said sheet of printed labels;

a resolver means associated with said lateral positioning means for sensing the phase of said lateral positioning means; and wherein said first control means receives data from said third sensing means based on the location of said registration mark and data from said resolver means based on the phase of said lateral positioning means to thereby control the lateral position of said sheet of printed labels.

9. The apparatus of either of claims 5 or 6 further comprising:

a third sensing means located upstream of said first sensing means for sensing the location of a second registration mark on each printed label of said sheet of printed labels;

a lateral positioning means located upstream of said third sensing means for adjusting the lateral position of said sheet of printed labels;

a resolver means associated with said lateral positioning means for sensing the phase of said lateral positioning means; and wherein said first control means receives data from said third sensing means based on the location of said second registration mark and data from said resolver means based on the phase of said lateral positioning means to thereby control the lateral position of said sheet of printed labels.

10. The apparatus of either of claims 5 or 6 further comprising:

a third sensing means located upstream of said first sensing means for sensing the location of said registration mark on each printed label of said sheet of printed labels;

a lateral positioning means located upstream of said third sensing means for adjusting the lateral position of said sheet of printed labels;

a resolver means associated with said lateral positioning means for sensing the phase of said lateral positioning means; and a third control means which receives data from said third sensing means based on the location of said registration mark and data from said resolver means based on the phase of said lateral positioning means to thereby control the lateral position of said sheet of printed labels.

11. The apparatus of either of claims 5 or 6 further comprising:

a third sensing means located upstream of said first sensing means for sensing the location of a second registration mark on each printed label of said sheet of printed labels;

a lateral positioning means located upstream of said third sensing means for adjusting the lateral position of said sheet of printed labels;

a resolver means associated with said lateral positioning means for sensing the phase of said lateral positioning means; and a third control means which receives data from said third sensing means based on the location of said second registration mark and data from said resolver means based on the phase of said lateral positioning means to thereby control the lateral position of said sheet of printed labels.

12. The apparatus of claim 8 wherein said third sensing means is a photocell having a beam size of about 0.25 inches.

13. The apparatus of claim 8 wherein said third sensing means is a line scan camera and photocell combination.

14. The apparatus of claim 8 wherein said third sensing means is a line scan camera.

15. The apparatus of claim 9 wherein said third sensing means is a photocell having a beam size of about 0.25 inches.

16. The apparatus of claim 9 wherein said third sensing means is a line scan camera and photocell combination.

17. The apparatus of claim 9 wherein said third sensing means is a line scan camera.

18. The apparatus of claim 10 wherein said third sensing means is a photocell having a beam size of about 0.25 inches.

19. The apparatus of claim 10 wherein said third sensing means is a line scan camera and photocell combination.

20. The apparatus of claim 10 wherein said third sensing means is a line scan camera.

21. The apparatus of claim 11 wherein said third sensing means is a photocell having a beam size of about 0.25 inches.

22. The apparatus of claim 11 wherein said third sensing means is a line scan camera and photocell combination.

23. The apparatus of claim 11 wherein said third sensing means is a line scan camera.

24. An apparatus comprising:

a first sensing means for sensing the location of a registration mark on each printed label of a sheet of printed labels;

an encoding means located downstream of said first sensing means for sensing the speed and location of said sheet of printed labels;

an embossing means located downstream of said encoding means for embossing each printed label of said sheet of printed labels;

a first resolving means associated with said embossing means for sensing the phase and speed of said embossing means;

a second sensing means located upstream of said first sensing means for sensing the location of said registration mark on each printed label of said sheet of printed labels;

a lateral positioning means located upstream of said second sensing means for adjusting the lateral position of said sheet of printed labels;

a second resolving means associated with said lateral positioning means for sensing the phase of said lateral positioning means; and a control means for controlling said embossing means and said lateral positioning means, wherein said control means receives data from said first sensing means based on the location of said registration mark, data from said encoding means based on the speed and phase of said sheet of printed labels and data from said first resolving means based on the speed and phase of said embossing means to thereby control said embossing means and ensure that each printed label is embossed at a specific location within specified tolerances and wherein said control means receives data from said second sensing means based on the location of said registration mark and data from said second resolving means based on the phase of said lateral positioning means to thereby control the lateral position of said sheet of printed labels.

25. An apparatus comprising:

a first sensing means for sensing the location of a first registration mark on each printed label of a sheet of printed labels;

an encoding means located downstream of said first sensing means for sensing the speed and location of said sheet of printed labels;

an embossing means located downstream of said encoding means for embossing each printed label of said sheet of printed labels;

a first resolving means associated with said embossing means for sensing the phase and speed of said embossing means;

a second sensing means located upstream of said first sensing means for sensing the location of a second registration mark on each printed label of said sheet of printed labels;

a lateral positioning means located upstream of said second sensing means for adjusting the lateral position of said sheet of printed labels;

a second resolving means associated with said lateral positioning means for sensing the phase of said lateral positioning means; and a control means for controlling said embossing means and said lateral positioning means, wherein said control means receives data from said first sensing means based on the location of said first registration mark, data from said encoding means based on the speed and phase of said sheet of printed labels and data from said first resolving means based on the speed and phase of said embossing means to thereby control said embossing means and ensure that each printed label is embossed at a specific location within specified tolerances and wherein said control means receives data from said second sensing means based on the location of said second registration mark and data from said second resolving means based on the phase of said lateral positioning means, to thereby control the lateral position of said sheet of printed labels.

26. An apparatus comprising:

a first sensing means for sensing the location of a registration mark on each printed label of a sheet of printed labels;

an encoding means located downstream of said first sensing means for sensing the speed and location of said sheet of printed labels;

an embossing means located downstream of said encoding means for embossing each printed label of said sheet of printed labels;

a first resolving means associated with said embossing means for sensing the phase and speed of said embossing means;

a first control means for controlling said embossing means, wherein said first control means receives data from said first sensing means based on the location of said registration mark, data from said encoding means based on the speed and phase of said sheet of printed labels and data from said first resolving means based on the speed and phase of said embossing means to thereby control said embossing means and ensure that each printed label is embossed at a specific location within specified tolerances;

a second sensing means located upstream of said first sensing means for sensing the location of said registration mark on each printed label of said sheet of printed labels;

a lateral positioning means located upstream of said second sensing means for adjusting the lateral position of said sheet of printed labels;

a second resolving means associated with said lateral positioning means for sensing the phase of said lateral positioning means; and a second control means for controlling said lateral positioning means, wherein said second control means receives data from said second sensing means based on the location of said registration mark and data from said second resolving means based on the phase of said lateral positioning means to thereby control the lateral position of said sheet of printed labels.

27. An apparatus comprising:

a first sensing means for sensing the location of a first registration mark on each printed label of a sheet of printed labels;

an encoding means located downstream of said first sensing means for sensing the speed and location of said sheet of printed labels;

an embossing means located downstream of said encoding means for embossing each printed label of said sheet of printed labels;

a first resolving means associated with said embossing means for sensing the phase and speed of said embossing means;

a first control means for controlling said embossing means, wherein said first control means receives data from said first sensing means based on the location of said first registration mark, data from said encoding means based on the speed and phase of said sheet of printed labels and data from said first resolving means based on the speed and phase of said embossing means to thereby control said embossing means and ensure that each printed label is embossed at a specific location within specified tolerances;

a second sensing means located upstream of said first sensing means for sensing the location of a second registration mark on each printed label of said sheet of printed labels;

a lateral positioning means located upstream of said second sensing means for adjusting the lateral position of said sheet of printed labels;

a second resolving means associated with said lateral positioning means for sensing the phase of said lateral positioning means; and a second control means for controlling said lateral positioning means, wherein said second control means receives data from said second sensing means based on the location of said second registration mark and data from said second resolving means based on the phase of said lateral positioning means to thereby control the lateral position of said sheet of printed labels.

* * * * *